United States Patent Office 2,955,359
Patented Oct. 11, 1960

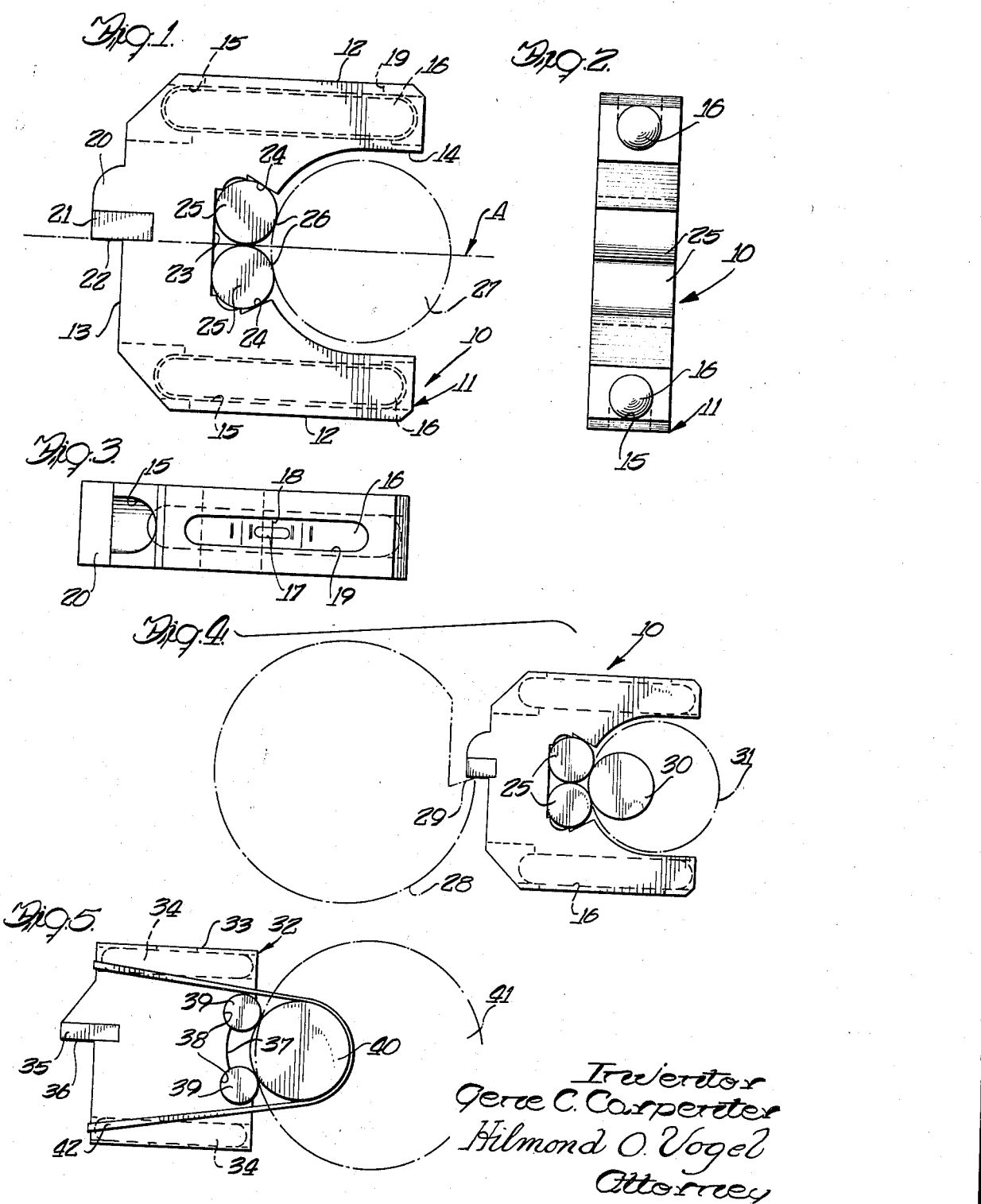

2,955,359
TOOL SETTING GAUGE
Gene C. Carpenter, 207 S. Wooddale, Decatur, Ill.
Filed Feb. 25, 1958, Ser. No. 717,364
1 Claim. (Cl. 33—185)

This invention relates to a tool setting gauge. More specifically this invention relates to a gauge for use in connection with machine tool application.

It is a prime object of this invention to provide an improved tool setting gauge which is adapted to provide a reference surface so that cutting tools can be adjusted a given amount relative to the center of the work supported on a metal working machine.

A still further object is the provision of a tool setting gauge which may be used on a lathe or similar machine tool for the purpose of quickly determining the longitudinal axis or center of a cylindrical work-piece so that a turning tool may be placed in operating position relative to the work.

A still further object is the provision of an improved tool setting gauge adapted to be quickly attached to a work-piece to provide a reference surface for a turning tool, the said gauge including magnetic centering means which is adapted to releasably secure the gauge to the work-piece operated upon.

A still further object is the provision of an improved tool setting gauge of simplified construction which is easy to handle, can be utilized in limited areas and which will provide a quick reference surface with respect to a turning tool positioned for engaging a work-piece.

A still further and more specific object of the invention is the provision of a tool setting gauge having magnetic work-engaging and centering means, the said tool comprising a body having a hardened setting surface which is adapted to be engaged by a cutting tool to provide for centering of the tool relative to the longitudinal axis of the work-piece which may be mounted on a rotating machine tool.

A still further object is the provision of a tool setting gauge having a pair of cylindrical magnets adapted to engage a work-piece, the said gauge including a bubble level and being adapted to be supported on the work-piece by means of a flexible band which permits mounting and dismounting of the gauge relative to the work-piece.

These and other objects will become more readily apparent from a reading of the description when examined in connection with the accompanying sheet of drawing.

In the drawing:

Figure 1 is a side elevational view of a tool setting gauge showing its relation to a work-piece adapted to be mounted for rotation on a machine tool;

Figure 2 is an end view of a tool setting gauge shown in Figure 1;

Figure 3 is a plan view of a tool setting gauge shown in Figures 1 and 2;

Figure 4 is a side elevational view of a tool setting gauge showing its relation to a cylindrical work-piece and to a suitable adjustable cutting tool adapted to engage a cylindrical work-piece; and Figure 5 is a side elevational view of a modified tool setting gauge shown positioned in operating relation with respect to a cylindrical work-piece, the said view showing an improved device for releasably securing the tool setting gauge on the work-piece.

Referring now particularly to Figures 1 through 4, a tool setting gauge is generally designated by the reference character 10. The tool setting gauge 10 comprises a body 11 having upper and lower substantially parallel edge surfaces 12 and a transversely extending edge surface 13. One side of the body 11 is provided with a substantially U-shaped recess 14. Upper and lower portions of the body 11 are provided with longitudinally extending bores 15 which contain substantially parallel bubble or spirit levels 16. As indicated in Figure 3, the spirit levels 16 are adapted to contain a suitable liquid having a bubble 17 therein, the said levels being of conventional construction and design. The levels are usually of glass or plastic design including suitable graduations which are indicated at 18 in Figure 3. The surfaces 12 are provided with suitable slots 19 which permit quick and ready visual observations of the spirit levels and particularly the bubble 17. The upper bubble level 16 as viewed in Figures 1, 4 and 5 is registerable for setting a cutting tool 28 positioned forwardly of a work-piece 27, 30, 31, 40 or 41 and the lower bubble level 16 is registerable by inverting the gauge for setting a cutting tool positioned rearwardly of a work-piece.

As indicated the edge surface 13 extends transversely with respect to the surfaces 12 and this surface includes a projection 20 having connected thereto a tool setting member 21. The tool setting member 21 is of carbide or other similar material construction having unusual hardness and wear resistance. The tool setting member 21 comprises a tool setting surface 22, which as indicated in Figure 4, is adapted to be engaged by a suitable cutting tool. A central portion of the body 11 immediately adjacent the recess 14, is provided with an aperture 23 having inwardly tapering edges 24. A pair of cylindrical or rod-like permanent magnets 25 are secured in the aperture 23, the magnets having outer cylindrical engaging edges 26 which are adapted to engage a work-piece 27 as shown in Figure 1.

The surface 22 has a plane designated by the line A which passes and is coincident with a plane extending through the longitudinal axis of the work-piece 27 when the gauge has been placed in position relative to the work-piece. The spirit levels 16 have their longitudinal axes parallel to the said plane A and the magnets 25 have their longitudinal axes aligned with respect to a plane perpendicular to the plane A. The engaging edges 26 are spaced equi-distant on opposite sides of the plane A.

Figure 4 shows a suitable cutter 28 having a cutting edge 29 in engagement with the surface 22 of the tool setting member 21.

In the application of the gauge 10 it may be desired, for instance, to place the cutting tool exactly in a position where the cutting edge 29 is centered with respect to the longitudinal axis of the cylindrical work-piece. Thus as shown in Figure 4 the body 11 is so positioned as to straddle the work-piece 30 or work-piece 31 with the cylindrical magnets 25 having their engaging edges 26 against the outer peripheral surface of the work-piece 30. Since the magnets are engaged with a magnetically attractable work-piece 30 or 31 the gauge is releasably secured to the work-piece and the operator merely rotates the body 11 until the spirit level shows that the gauge is in a level position. Now the cutter 28 is moved into the position shown in Figure 4 and it is apparent that the plane A of the setting surface 22 is coincident with the center of the work-piece so that now the cutting end 29 is disposed exactly on the center. Thus the operator can quickly find the center of the work-piece and adjust the cutter accordingly while the magnets releasably secure the gauge 10 to the work. No other provision for supporting the gauge is necessary other than the magnets when the gauge 10 is used in connection with a magnetically attractable work-piece.

Figure 5 shows a modified form of the invention wherein the gauge 32 comprises a body 33 having similar transversely spaced spirit levels 34. The body 33 also includes a tool setting member 35 having a tool setting surface 36. One side of the body 33 is recessed as indicated at 37 and is provided with transversely extending slots 38 in which cylindrical centering members 39 are positioned. The centering members 39 may also be permanent magnets adapted to engage a ferrous or magnetically attractable work-piece 40 or 41. In the event that the work-piece is non-magnetic, then a rubber band or ribbon 42 is utilized and placed around the body 32 and the work-piece 40 or 41 to suitably releasably secure the gauge 32 in position. The gauge shown in Figure 5 obviously may be used with any size cylindrical work-piece 41 whereas the gauge shown in Figures 1 through 4 has particular adaptation to smaller work-pieces which normally might be positioned in the standard metal cutting machine.

Thus the objects of the invention have been fully achieved and a new and improved tool setting gauge has been described. It must be understood that changes and modifications may be made without departing from the spirit of the invention as disclosed or the scope thereof as described in the appended claim.

What is claimed is:

A tool setting gauge for machine tools comprising a gauge body, said gauge body having a pair of parallel spaced first edge surfaces, and a second edge surface extending laterally with respect to said first edge surfaces, a bubble level disposed on said body adjacent each of said first edge surfaces, the bubble levels having their respective outer surfaces positioned in substantially parallel spaced relation, one of said bubble levels being positioned in registerable relation for setting a forwardly disposed tool and the other of said bubble levels being positioned in registerable relation for setting a rearwardly disposed tool, said body having a recess opposite to said second edge surface, a tool setting member on said second edge surface, said tool setting member having a tool engaging surface, said tool engaging surface defining a plane in coinciding relation with a plane passing through the longitudinal axis of a magnetically attractable cylindrical work-piece, a pair of magnets in contiguous relation connected to said body, said magnets having their longitudinal axes in a plane extending transversely with respect to the plane of said tool engaging surface, said magnets having cylindrical surfaces projecting outwardly in position for engaging said magnetically attractable work-piece and for releasably securing said gauge thereto, said longitudinal axes of said magnets being spaced equi-distant from the plane of said tool engaging surface.

References Cited in the file of this patent

UNITED STATES PATENTS

| | | |
|---|---|---|
| 2,125,682 | Meluzin | Aug. 2, 1938 |
| 2,667,703 | Zumkeller | Feb. 2, 1954 |
| 2,820,302 | Mitchell | Jan. 21, 1958 |

FOREIGN PATENTS

| | | |
|---|---|---|
| 549,271 | Great Britain | Nov. 13, 1942 |
| 593,810 | Great Britain | Oct. 27, 1947 |
| 252,378 | Switzerland | Aug. 16, 1948 |
| 859,556 | Germany | Dec. 15, 1952 |
| 787,966 | Great Britain | Dec. 18, 1957 |